(12) United States Patent
Bogdanski (10) Patent No.: US 10,718,237 B2
(45) Date of Patent: Jul. 21, 2020

(54) FORCE TRANSMISSION DEVICE

(71) Applicant: MAN Truck & Bus AG, München (DE)

(72) Inventor: Peter Bogdanski, Schwabach (DE)

(73) Assignee: MAN TRUCK & BUS AG, München (DE)

( * ) Notice: Subject to any disclaimer, the term of this patent is extended or adjusted under 35 U.S.C. 154(b) by 0 days.

(21) Appl. No.: 16/013,324

(22) Filed: Jun. 20, 2018

(65) Prior Publication Data

US 2018/0371961 A1 Dec. 27, 2018

(30) Foreign Application Priority Data

Jun. 21, 2017 (DE) .......................... 10 2017 113 783

(51) Int. Cl.
*F01L 1/24* (2006.01)
*F01L 13/00* (2006.01)
(Continued)

(52) U.S. Cl.
CPC ............... *F01L 1/2411* (2013.01); *F01L 1/18* (2013.01); *F01L 1/181* (2013.01); *F01L 1/2416* (2013.01); *F01L 1/267* (2013.01); *F01L 13/0015* (2013.01); *F01L 1/185* (2013.01); *F01L 1/344* (2013.01); *F01L 2001/0475* (2013.01); *F01L 2001/186* (2013.01); *F01L 2001/467* (2013.01); *F01L 2105/00* (2013.01); *F01L 2810/02* (2013.01);
(Continued)

(58) Field of Classification Search
CPC ... F01L 1/181; F01L 1/185; F01L 1/22; F01L 1/2411; F01L 2001/2444; F01L 1/344; F01L 1/46; F01L 13/0005; F01L 13/0015

USPC .......... 123/90.15, 90.16, 90.36, 90.45, 90.46
See application file for complete search history.

(56) References Cited

U.S. PATENT DOCUMENTS 4,387,680 A * 6/1983 Tsunetomi .............. F01L 1/181
123/198 F
4,777,914 A * 10/1988 Konno ................... F01L 1/2411
123/90.16
(Continued)

FOREIGN PATENT DOCUMENTS

DE 19608651 A1 9/1997
DE 19914046 A1 9/2000
(Continued)

*Primary Examiner* — Jorge L Leon, Jr.
(74) *Attorney, Agent, or Firm* — Weber Rosselli & Canon LLP (57) ABSTRACT

The present disclosure relates to a force transmission device for connection between a camshaft and a gas exchange valve including a main body with a receptacle which extends along a longitudinal axis. The force transmission device has an actuating piston which is provided in the receptacle such that it can move between a first position and a second position, and a contact body for actuating the gas exchange valve and in operative connection with the actuating piston. The force transmission device has a first blocking piston which is provided in the receptacle such that it can move in a radial direction with respect to the longitudinal axis between a third position, in which the first blocking piston blocks the actuating piston in the first position, and a fourth position, in which the first blocking piston releases a movement of the actuating piston between the first position and the second position.

20 Claims, 6 Drawing Sheets

(51) Int. Cl.
 *F01L 1/18* (2006.01)
 *F01L 1/26* (2006.01)
 *F01L 1/344* (2006.01)
 *F01L 1/047* (2006.01)
 *F01L 1/46* (2006.01)

(52) U.S. Cl.
 CPC ....... *F01L 2810/03* (2013.01); *F01L 2810/04* (2013.01)

(56) References Cited

U.S. PATENT DOCUMENTS

| | | |
|---|---|---|
| 6,422,186 B1 | 7/2002 | Vanderpoel |
| 2002/0014217 A1* | 2/2002 | Church .................... F01L 1/146 123/198 F |
| 2005/0098135 A1 | 5/2005 | Gecim et al. |
| 2005/0205019 A1* | 9/2005 | Burk ........................ F01L 1/08 123/21 |
| 2010/0170472 A1* | 7/2010 | Yang ........................ F01L 1/08 123/321 |
| 2011/0048352 A1* | 3/2011 | Hendriksma ............. F01L 1/14 123/90.42 |
| 2014/0137838 A1 | 5/2014 | Girard et al. |
| 2015/0013627 A1* | 1/2015 | Nunami .................. F01L 1/185 123/90.16 |
| 2017/0284313 A1* | 10/2017 | Shewell ............. F02D 13/0211 |

FOREIGN PATENT DOCUMENTS

| | | |
|---|---|---|
| DE | 19915531 A1 | 10/2000 |
| DE | 10224036 A1 | 12/2003 |
| DE | 102005040649 A1 | 3/2007 |
| DE | 102007051302 A1 | 4/2009 |
| DE | 102008052499 A1 | 5/2009 |
| DE | 102008047501 A1 | 4/2010 |
| DE | 102011052246 A1 | 5/2012 |
| EP | 0255668 A2 | 2/1988 |
| EP | 1087109 A2 | 3/2001 |
| EP | 1881166 A1 | 1/2008 |
| EP | 2672092 A1 | 12/2013 |
| JP | S54159520 A | 12/1979 |
| JP | S60228714 A | 11/1985 |

\* cited by examiner

FORCE TRANSMISSION DEVICE

BACKGROUND

The present disclosure relates to a force transmission device, in particular a rocker lever or finger-type rocker, for producing an operative connection between a camshaft and a gas exchange valve.

It is generally known to use variable valve drives for changing switching times and valve strokes of gas exchange valves of an internal combustion engine during the operation of the internal combustion engine. A plurality of variable valve drives are known in the prior art.

DE 10 2011 052 246 A1 discloses an integrated variable-valve actuator device of a variable valve stroke device. The device has a rocker lever which rotates on a rocker lever shaft and which has an oil supply line which selectively supplies oil. The device has a fastening device which passes through a side of the rocker lever, and oil which is supplied by the oil supply line is discharged through an oil passage. The device has a valve bridge which is arranged at the bottom of the fastening device and places valves under pressure. The device has an actuator device with an actuator piston which is inserted into the valve bridge and is designed with an oil supply passage. The device has an actuator spring which is inserted into the actuator piston and which acts upon the actuator piston with an elastic force. The device has a variable control device which is arranged at the bottom of the actuator piston and which sets the heights of the actuator piston by a movement which is produced by the hydraulic pressure of the oil which is supplied by the oil supply passage.

DE 10 2005 040 649 A1 discloses a variable valve drive of a cam-actuated gas exchange valve of an internal combustion engine, having a force transmission device which is arranged between the cam and the gas exchange valve and which comprises a hydraulic lifting device having a pressure piston which is longitudinally displaceable in a cylinder, which piston delimits a pressure space connected to a pressure medium supply of the internal combustion engine and which, when acted upon by high pressure, allows an actuation of the gas exchange valve that is independent of the cam. Here, the force transmission device is intended to be designed as a swing or rocker lever mounted rotatably on a lever axle, wherein the lever axle has a pressure medium-channelling longitudinal duct as a connecting path between the pressure medium supply and the pressure space.

U.S. Pat. No. 6,422,186 B1 discloses a system for actuating a valve of an internal combustion engine. The system has a rocker lever with a piston depression. A lost motion piston is displaceably guided in the piston depression.

Further valve drives are known for example from EP 1 087 109 A2, DE 199 15 531 A1 and EP 0 255 668 A2.

SUMMARY

The object of the present disclosure is to provide an alternative or improved force transmission device for a variable valve drive. In particular, there is intended to be provided a force transmission device which allows a reliable and simple change of a valve stroke of a gas exchange valve.

The force transmission device can be designed in particular as a rocker lever or finger-type rocker. The force transmission device is provided for producing an operative connection between a camshaft and a gas exchange valve, in particular an inlet valve, of an internal combustion engine. The force transmission device has a main body with an, in particular cylindrical, receptacle which extends along a longitudinal axis. The force transmission device has an, in particular hydraulic, actuating piston which is provided in the receptacle such that it can move back and forth between a first position and a second position along the longitudinal axis. The force transmission device has a contact body for actuating the gas exchange valve and in operative connection with the actuating piston such that a movement of the actuating piston along the longitudinal axis leads to a movement of the contact body along the longitudinal axis to change (for example in a two-stage manner) a valve stroke of the gas exchange valve. The force transmission device has a first, in particular hydraulic, blocking piston. The first blocking piston is provided in the receptacle such that it can move back and forth in a radial direction with respect to the longitudinal axis between a third position, in which the first blocking piston blocks the actuating piston in the first position, and a fourth position, in which the first blocking piston releases a movement of the actuating piston between the first position and the second position.

The force transmission device allows the selective switching between two different valve strokes. In a first switching position, a movement of the actuating piston is blocked. In a second switching position, the actuating piston executes a lost motion by which the valve stroke is reduced.

In particular, the receptacle can have a bottom region on which the actuating piston bears in the second position and/or is supported by an elastic element.

The actuating piston can additionally have a venting duct which is fluidically connected to a control fluid space of the actuating piston in order to vent very small quantities.

It is also possible for the force transmission device to produce an operative connection between a camshaft and an outlet valve.

In at least one embodiment, the force transmission device has a second, for example hydraulic, blocking piston. The second blocking piston may be situated opposite the first blocking piston. The second blocking piston is provided in the receptacle such that it can move back and forth in a radial direction with respect to the longitudinal axis between a fifth position, in which the second blocking piston blocks the actuating piston in the first position, and a sixth position, in which the second blocking piston releases a movement of the blocking piston between the first position and the second position. It is possible with the aid of the two blocking pistons for the actuating piston to be blocked more securely than with only one blocking piston in a first position if this is desired.

In particular, the first blocking piston and the second blocking piston can be provided such that they move only jointly or simultaneously.

In a further embodiment, the blocking of the actuating piston in the first position, on the one hand, and the release of the displacement of the actuating piston between the first position and the second position, on the other hand, allows (effects) a two-stage valve stroke variability for producing two different valve stroke profiles of the gas exchange valve.

In yet another embodiment, the actuating piston is elastically prestressed in a direction to the first position. Alternatively or additionally, the first blocking piston is elastically prestressed in a direction to the third position. Alternatively or additionally, the second blocking piston is elastically prestressed in a direction to the fifth position. Alternatively or additionally, the first blocking piston and the second blocking piston are elastically supported with respect to one another. The elastic prestressing of the pistons makes it possible to achieve a failsafe function in which the pistons are fixed in a secure position for operation.

In another exemplary embodiment, the receptacle has a groove, in particular a cylindrical circumferential groove around the longitudinal axis. The first blocking piston is mounted in the groove in the third position, with the result that a movement of the first blocking piston (and thus of the actuating piston) along the longitudinal axis is blocked. The first blocking piston is mounted outside the groove in the fourth position, with the result that a movement of the first blocking piston (and thus of the actuating piston) along the longitudinal axis is released. Alternatively or additionally, the second blocking piston is mounted in the groove in the fifth position, with the result that a movement of the second blocking piston (and thus of the actuating piston) along the longitudinal axis is blocked. The second blocking piston is mounted outside the groove in the fourth position, with the result that a movement of the first blocking piston (and thus of the actuating piston) along the longitudinal axis is released.

In an embodiment variant, when the actuating piston is acted upon via the contact body in a direction along the longitudinal axis to the second position, the actuating piston executes a lost motion from the first position to the second position if the first blocking piston and/or the second blocking piston release(s) the movement of the actuating piston between the first position and the second position. The valve stroke of the gas exchange valve is reduced by this lost motion.

In a further embodiment variant, the first blocking piston can be acted upon, in particular hydraulically by supplying a control fluid, to move from the third position to the fourth position. Alternatively or additionally, the second blocking piston can be acted upon, in particular hydraulically by supplying a control fluid, to move from the fifth position to the sixth position.

The force transmission device can preferably have a control fluid supply duct which opens into the groove in which the first blocking piston is mounted in the third position and/or the second blocking piston is mounted in the fifth position.

In particular, the force transmission device can have a control fluid supply in which a switching valve and/or non-return valve are/is preferably provided.

In a development, the first blocking piston and/or the second blocking piston are/is guided in or on the actuating piston in the radial direction with respect to the longitudinal axis.

In particular, the first blocking piston and/or the second blocking piston can be provided in a control fluid space of the actuating piston so as to be movable in a radial direction with respect to the longitudinal axis of the receptacle.

In one embodiment, only when there is substantially force-free operative connection between the camshaft and the gas exchange valve via the force transmission device, a movement of the first blocking piston and/or of the second blocking piston is released in the radial direction with respect to the longitudinal axis. Consequently, a movement of the blocking pistons to the fifth or sixth position can take place only in the base circle region of the cam.

In a further embodiment, when the first blocking piston and/or the second blocking piston (for example while the valve stroke region of the cam is in operative connection with the force transmission device) is acted upon via the contact body in a direction along the longitudinal axis to the second position, a movement of the first blocking piston from the third position into the fourth position and/or of the second blocking piston from the fifth position into the sixth position is blocked. The movement is blocked in particular by a static friction, caused on account of the valve opening force, of the first blocking piston and/or second blocking piston on the groove.

In a further embodiment variant, the force transmission device has a control fluid supply and, provided separately thereto, lubricating fluid supply. Consequently, independently of whether a control fluid supply is activated, lubrication can be carried out.

In a further exemplary embodiment, the force transmission device has a damping chamber which can be filled with a control fluid and which is emptied during movement of the actuating piston from the first position to the second position, in particular while generating a turbulent flow, to damp the movement of the actuating piston, wherein, preferably, the damping chamber is delimited by the actuating piston and the receptacle. Consequently, a soft valve stroke run-in can be ensured.

In particular, the damping chamber can be fluidically connected to a control fluid space of the actuating piston via at least one duct.

The damping chamber can preferably be filled with control fluid from a control fluid space of the actuating piston and/or from a control fluid supply during movement of the actuating piston from the second position into the first position, during movement of the first blocking piston from the third position into the fourth position and/or during movement of the second blocking piston from the fifth position into the sixth position.

The damping chamber can preferably be delimited between a bottom region of the receptacle, a circumferential wall surface of the receptacle and the actuating piston.

In a further embodiment, the force transmission device has an anti-rotation safeguard which blocks a rotation of the first blocking piston and/or second blocking piston (for example around the radial direction with respect to the longitudinal axis).

In a further embodiment, the force transmission device has an, in particular hydraulic or mechanical, valve play compensation device which is arranged on the contact body in operative connection with the actuating piston and the contact body to compensate for a valve play.

The valve play compensation device can preferably be designed as a (so-called) HVC element (hydraulic valve play compensation element).

In particular, the valve play compensation device can be provided in the receptacle so as to be movable along the longitudinal axis of the receptacle. The valve play compensation device can preferably move along the longitudinal axis with a movement of the actuating piston and of the contact body.

A lubricating fluid space of the valve play compensation device can preferably be fluidically connected (for example via a venting duct) with a control fluid space of the actuating piston.

Moreover, the present disclosure relates to the use of the force transmission device as disclosed herein for producing a reduced valve stroke for at least one inlet valve or outlet valve, in particular in combination with a camshaft phase adjuster for the camshaft for producing a Miller control time (control time with advanced closing time point with respect to an Otto or diesel cycle process) for at least one inlet valve.

Finally, the present disclosure also relates to a motor vehicle, in particular a commercial vehicle (for example a bus or lorry), having the force transmission device as disclosed herein.

It is also possible to use the force transmission device as disclosed herein for passenger cars, large engines, off-road vehicles, stationary engines, marine engines, etc.

BRIEF DESCRIPTION OF THE DRAWINGS

The above-described preferred embodiments and features of the present disclosure may be combined with one another in any desired manner. Further details and advantages of the present disclosure will be described below with reference to the appended drawings. In the drawings.

The embodiments shown in the figures at least partially correspond, and therefore similar or identical parts are denoted with the same reference designations, and for the explanation of said parts, reference is also made to the description of the other embodiments or figures in order to avoid repetitions.

DETAILED DESCRIPTION

Figure 1:
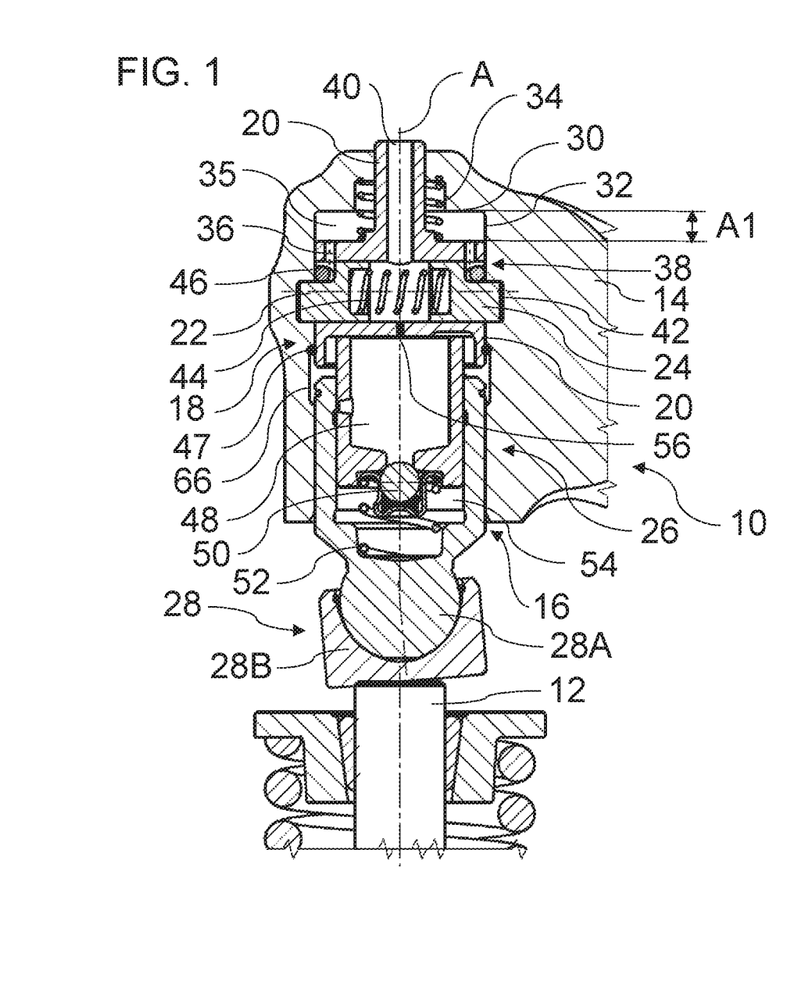
FIG. 1 shows a sectional view through a force transmission means of a variable valve drive having a device for adapting a valve stroke.

A region of a force transmission device 10 is illustrated in FIG. 1. The force transmission device 10 is in particular a rocker lever but can also be, for example, a finger-type rocker.

The force transmission device 10 is in operative connection between a camshaft (not shown) and a partially illustrated gas exchange valve 12. In particular, the force transmission device 10 transmits a cam contour of a cam of the camshaft to the gas exchange valve 12. Here, a rotation of the camshaft is converted into a stroke movement of the gas exchange valve 12. The gas exchange valve 12 can in particular be an inlet valve. However, it is also possible for the gas exchange valve to be an outlet valve.

The force transmission device 10 has a partially illustrated main body 14. The main body 14 is mounted so as to be pivotable about a lever axle (for example rocker lever axle). The main body 14 has a receptacle 16 in the region above a valve stem of the gas exchange valve 12. The receptacle 16 takes the form of a substantially cylindrical depression in the main body 14. The receptacle 16 extends along a longitudinal axis A into the main body 14.

The receptacle 16 has arranged therein a device 18 for changing a valve stroke of the gas exchange valve 12 in a two-stage manner.

The device 18 has an actuating piston 20, a first blocking piston 22, a second blocking piston 24, a hydraulic valve play compensation device 26 and a contact body 28.

The actuating piston 20 is arranged in the receptacle 16 so as to be axially displaceable along the longitudinal axis A of the receptacle 16. Specifically, the actuating piston 20 is axially displaceable between a first position, as illustrated in FIG. 1, and a second position. In the second position, the actuating piston 20 can bear partially on a bottom region 30 of the receptacle 16. A circumferential wall surface 32 of the receptacle 16 serves for axially guiding the actuating piston 20. In the operating state of the device 18 as illustrated in FIG. 1, a displacement of the actuating piston 20 from the first position into the second position is blocked by the blocking pistons 22, 24.

The actuating piston 20 is axially prestressed by a first elastic element 34 in a direction to the first position. The first elastic element 34 can be a helical spring, for example. The first elastic element 34 can be arranged between the bottom region 30 and the actuating piston 20. The first elastic element 34 can support the actuating piston 20 on the bottom region 30.

The actuating piston 20, the bottom region 30 and the circumferential wall surface 32 delimit an annular damping chamber 35. The damping chamber 35 is connected to a control fluid space 38 of the actuating piston 20 via a plurality of ducts 36. The actuating piston 20 additionally has a central venting duct 40 for venting the control fluid space 38.

The first blocking piston 22 and the second blocking piston 24 are mounted and guided so as to be displaceable in the control fluid space 38 of the actuating piston 20. Specifically, the blocking pistons 22, 24 are radially displaceable with respect to a longitudinal axis A of the receptacle 16. In the position of the first blocking piston 22 as illustrated in FIG. 1, the first blocking piston 22 is supported on a shoulder of a first circumferential groove 42 of the receptacle 16. In order to be able to draw a better distinction from the first and second position of the actuating piston 20, this position is herein also designated as third position. The second blocking piston 24 in the position illustrated in FIG. 1 (also designated below as fifth position) is likewise supported on the shoulder of the first circumferential groove 42. This supporting of the blocking pistons 22, 24 has the effect of blocking the movement of the actuating piston 20 from the first position illustrated in FIG. 1 into the second position. The first circumferential groove 42 extends in a circumferential direction around the longitudinal axis A of the receptacle 16 in the circumferential wall surface 32.

An elastic element 44 supports the first blocking piston 22 and the second blocking piston 24 with respect to one another. The elastic element 44 can be designed as a helical spring, for example. The elastic element 44 is arranged between the first blocking piston 22 and the second blocking piston 24 in the control fluid space 38. The elastic element 44 prestresses the first blocking piston 22 in a direction to the third position and the second blocking piston 24 in a direction to the fifth position.

The blocking pistons 22, 24 can be acted upon hydraulically by a control fluid. The control fluid can be supplied by a supply line (not shown) which opens into the first circumferential groove 42. A supply of the control fluid has the effect that the blocking pistons 22, 24 move towards one another, that is to say move in a direction towards the longitudinal axis A. As soon as the blocking pistons 22, 24 are no longer supported on the shoulder of the first circumferential groove 42, a movement of the actuating piston 20 from the first position into the second position is released (no longer blocked).

In some embodiments, the device 18 can have only one blocking piston which is prestressed via an elastic element in a blocking position to block a movement of the actuating piston.

In order to prevent a rotation of the blocking pistons 22, 24 about their respective longitudinal axis, one or more anti-rotation safeguards 46 is/are provided in arc form or arc segment form. The anti-rotation safeguard(s) 46 support(s) the blocking pistons 22, 24 securely against rotation on the actuating piston 20.

The hydraulic valve play compensation device 26 is arranged between the actuating piston 20 and the contact body 28. The valve play compensation device 26 can move together with the actuating piston 20 along the longitudinal axis A of the receptacle 16 if the blocking pistons 22, 24 release such a movement.

The valve play compensation device 26 has a lubricating fluid space 48, a check ball 50, a restoring spring 52 and a high-pressure space 54. The valve play compensation device 26 is thus designed as a conventional hydraulic valve play compensation element (so-called HVC element), and therefore its mode of operation for compensating for a variable gap between a ball foot 28A and a ball receptacle 28B of the contact body 28 is not described in more detail herein. The provision of the valve play compensation device 26 means that the valve play does not have to be set. However, it should be noted that, over and beyond a conventional valve play compensation element, the valve play compensation device 26 used herein is provided so as to be in particular displaceable with the actuating piston 20, and the lubricating fluid space 48 is connected to the control fluid space 38 via a duct 56 of the actuating piston 20.

Figure 11:
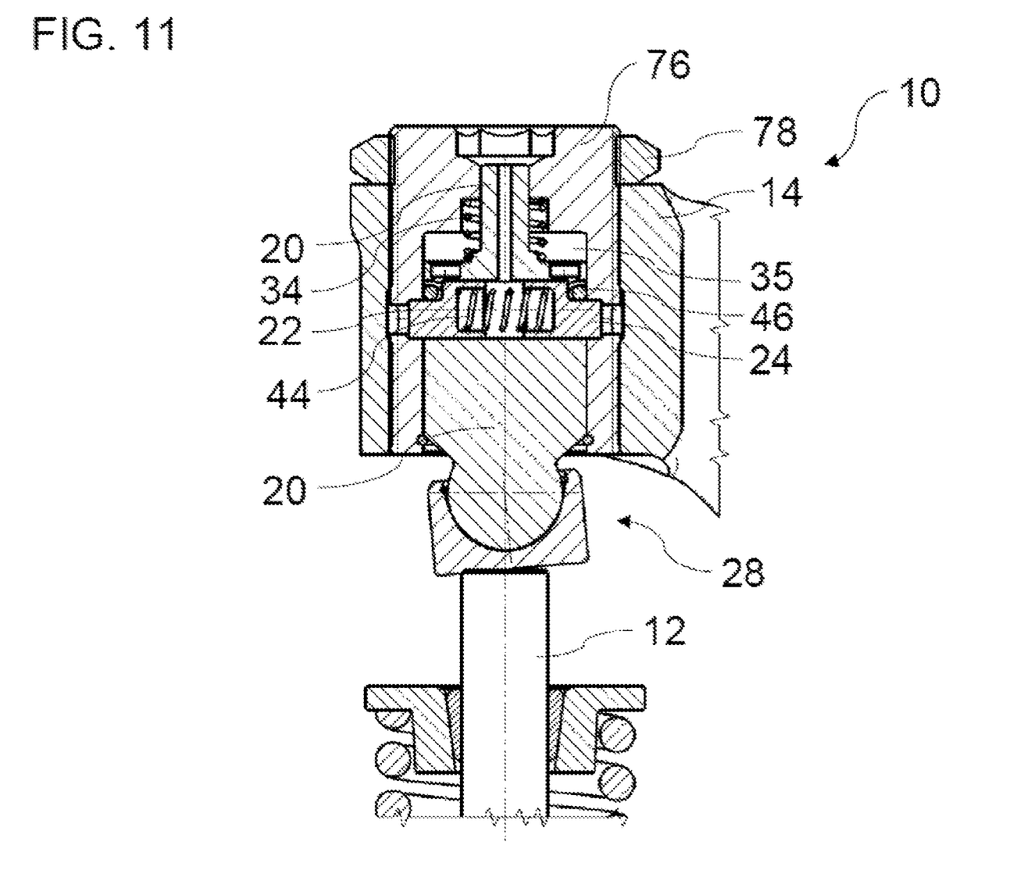
FIG. 11 shows a sectional view through a force transmission means of a variable valve drive with an alternative embodiment of the device as a rigid adjusting element for adapting a valve stroke.

In some embodiments, no hydraulic valve play compensation device is incorporated (see for example the embodiment in FIG. 11).

Figure 2:
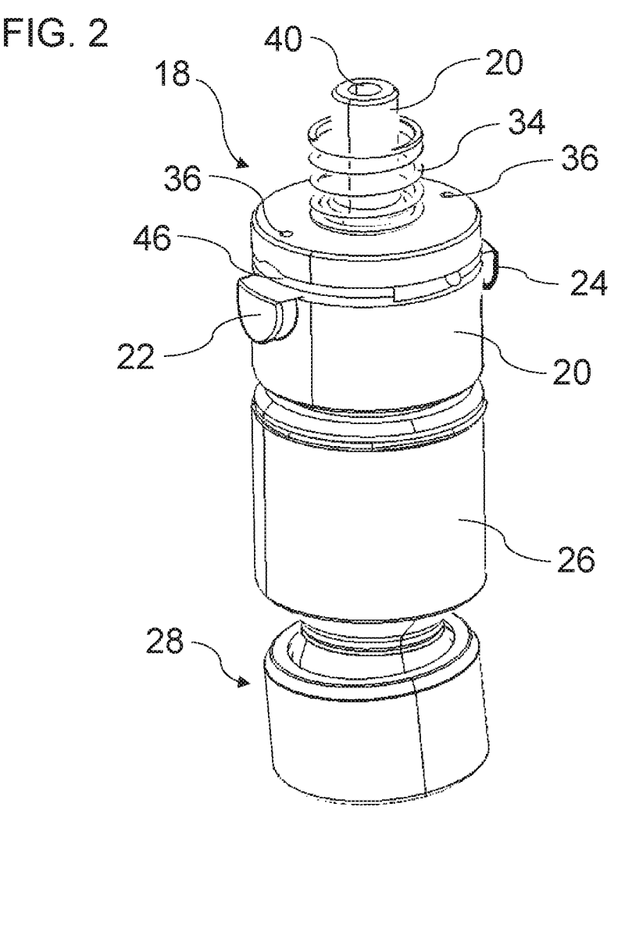
FIG. 2 shows a perspective outer view of the device for adapting a valve stroke.

FIG. 2 shows the device 18 in an outer view. Here, there can be clearly seen in particular the actuating piston 20, the blocking pistons 22 and 24, the hydraulic valve play compensation device 26 and the contact body 28.

Figure 3:
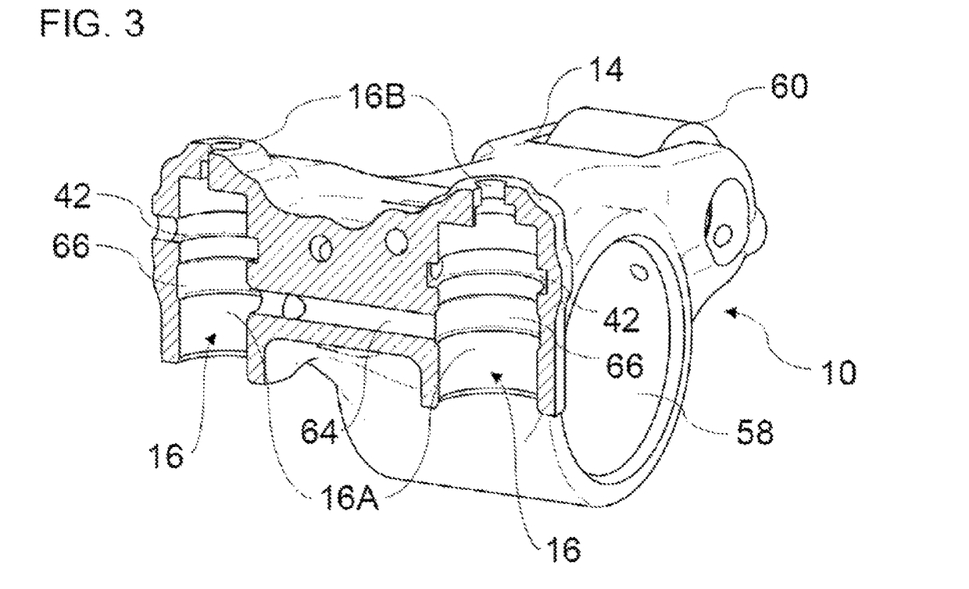
FIG. 3 shows a section through a perspective illustration of the force transmission means without devices for adapting a valve stroke.

FIG. 3 shows the force transmission device 10 as a rocker lever. The force transmission device 10 has two receptacles 16. Thus, the force transmission device 10 can receive two devices 18 (see FIGS. 1 and 2) by means of which the valve stroke of two gas exchange valves 12 (see FIGS. 1 and 2) can be adapted in a two-stage manner. However, it is also possible for a plurality of gas exchange valves to be actuated with only one device 18. The device 18 can then actuate two gas exchange valves, for example via an interposed valve bridge.

The force transmission device 10 additionally has a receptacle 58 for a lever axle (rocker lever axle) and a cam follower 60 in the form of a rotatably mounted roller.

Moreover, it can be clearly seen in FIG. 3 that the receptacle 16 takes the form of a through-hole with a first cylindrical region 16A and a second cylindrical region 16B. The region of the actuating piston 20 having the venting duct 40 is displaceably mounted in the second cylindrical region 16B.

Figure 4:
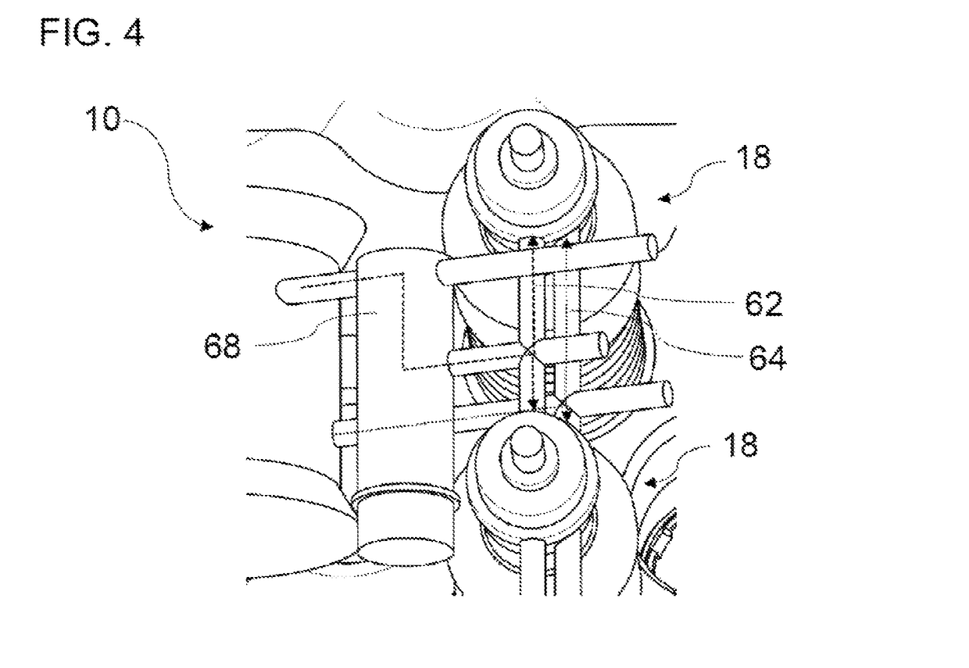
FIG. 4 shows a schematic view of a control fluid supply and of a lubricating fluid supply in the force transmission means for supplying to the devices for adapting a valve stroke.
Figure 5:
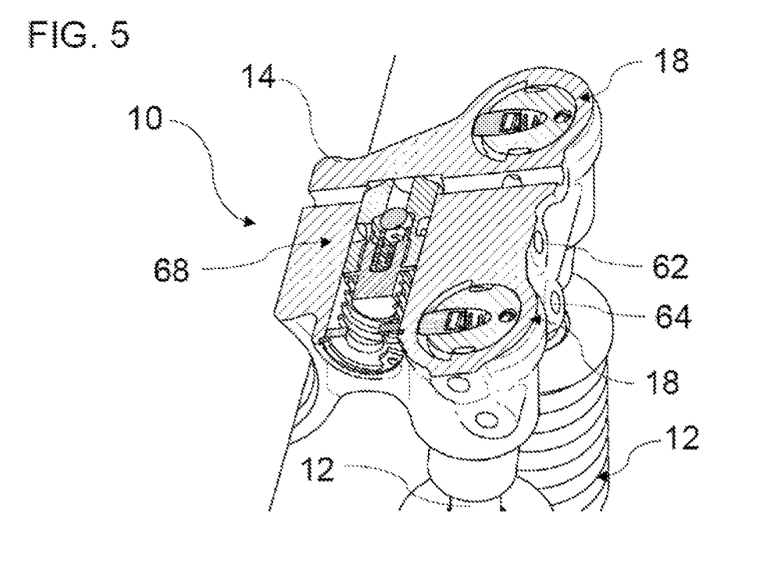
FIG. 5 shows a section through a perspective illustration of the force transmission device means having devices for adapting a valve stroke with a control or non-return valve.

It is additionally shown in FIGS. 3 to 5 that a control fluid supply (dashed line in FIG. 4) can be provided separately from a lubricating fluid supply (dotted line in FIG. 4). The control fluid supply for selectively hydraulically acting upon the blocking pistons 22, 24 (see FIGS. 1 and 2) has a control fluid duct 62. The control fluid duct 62 opens into the first circumferential groove 42. The lubricating fluid supply has a lubricating fluid duct 64. The lubricating fluid duct 64 serves in particular for supplying a lubricating fluid (for example lubricating oil) to the hydraulic valve play compensation device 26. The lubricating fluid duct 64 opens into a second circumferential groove 66 of the receptacle 16. In the mounted state, the bore ends of the ducts are closed for example by closure plugs or closure balls (not shown).

FIGS. 4 and 5 illustrates an optional control valve 68 of the force transmission device 10. The control valve 68 is provided in the control fluid supply. Upstream of the control valve 68 there can be provided a solenoid valve 73 (see FIG. 10) via which control fluid (for example control oil) can be supplied with an activation fluid pressure. The control fluid is supplied whenever it is desired to release a displacement movement of the actuating piston 20 between the first position and the second position. The control fluid duct 62 is arranged downstream of the control valve 68. The control valve 68 can serve as a return block. For example, the control valve can be designed as a non-return valve in order to prevent control fluid flowing back out of the control fluid duct 62 (the control fluid space 38).

In some embodiments, the control fluid supply and the lubricating fluid supply can also be provided jointly with one another.

FIG. 6 once again shows the force transmission device 10 with two devices 18 for changing the valve stroke in a two-stage manner.

Figure 6:
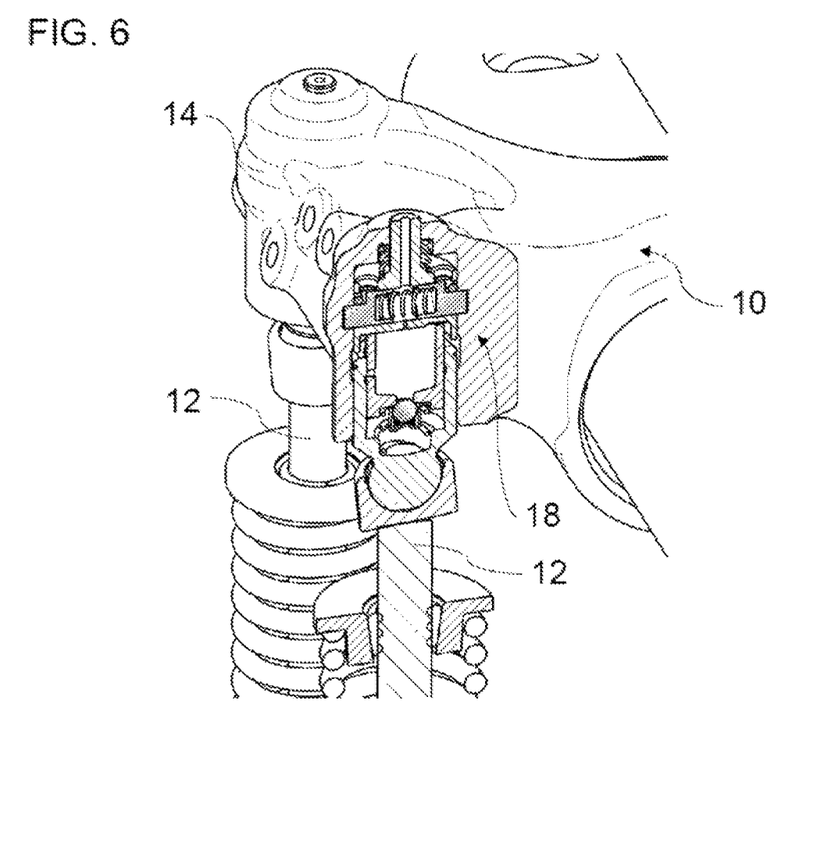
FIG. 6 shows a further section through a perspective illustration of the force transmission means having devices for adapting a valve stroke.

It should be emphasized here that, by virtue of the cylindrical designs of the receptacle 16, of the first circumferential groove 42 and of the actuating piston 20, the device 18 can be mounted in any rotary position (position of rotation) around a longitudinal axis of the device 18. Specifically, the device 18 can be simply pushed from below into the receptacle 16 in any rotary position around its longitudinal axis. The blocking pistons 22, 24 then axially secure the device 18 in the receptacle 16 by being supported in the first circumferential groove 42.

The mode of operation of the device 18 is described below with reference to FIGS. 1, 6, 7 and 8.

In FIG. 1, the device 18 is shown in a state which arises when no control fluid is supplied. The control fluid supply (the solenoid valve in the control fluid supply) is not activated. The blocking pistons 22, 24 are extended. The blocking pistons 22, 24 are pressed by the elastic element 44 into the first circumferential groove 42. The blocking pistons 22, 24 fix the actuating piston 20 in the first position. If the cam follower 60 (see FIG. 3) comes into contact with a valve stroke region of a cam of the camshaft, the cam contour of the cam is transmitted to the gas exchange valve 12 without displacement of the actuating piston 20 (as a result of a form-fitting engagement in the device 18). The form-fitting engagement in the force transmission means is produced between the first circumferential groove 42 and the blocking pistons 22, 24. The hydraulic valve play compensation device 26 compensates for a valve play. The valve stroke produced can correspond for example to the curve B in FIG. 9.

It should be emphasized here that, in the non-activated state of the device 18, the elastic elements 34 and 44 fix the pistons 20, 22, 24 in their starting positions, with the result that a failsafe functionality is present.

The behaviour of the force transmission device 10 with the device 18 activated is described below with reference to FIGS. 7 and 8. For the sake of better clarity, not all components are provided with reference designations in FIGS. 7 and 8.

Figure 7:
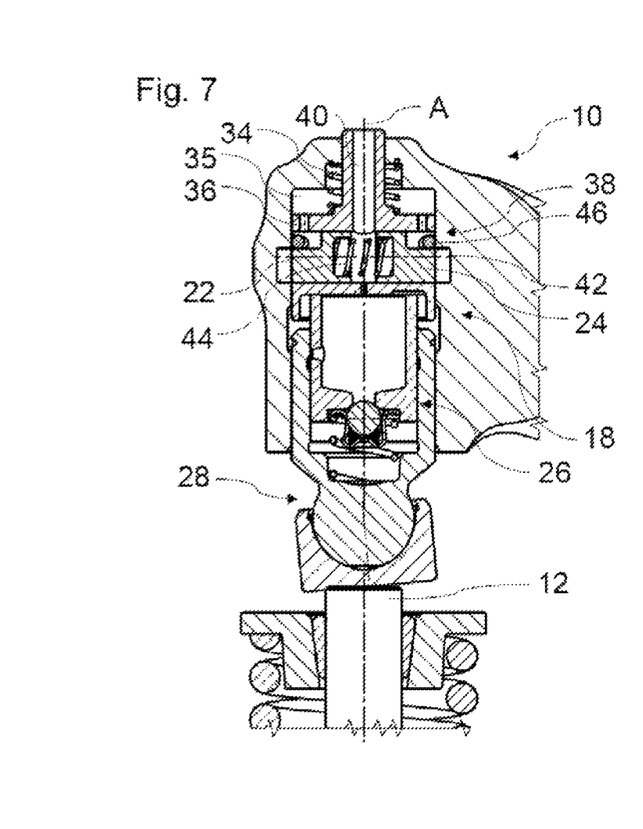
FIG. 7 shows a sectional view through the force transmission means with an activated and actuated device for adapting a valve stroke in the cam base circle position.

In FIG. 7, the device 18 is shown in a transition state which is assumed if control fluid is supplied and the cam of the camshaft is in the base circle region. The control fluid supply (the solenoid valve in the control fluid supply) is activated. The blocking pistons 22, 24 are pressed in a direction towards the longitudinal axis A by the control fluid supplied into the first circumferential groove 42.

The displacement of the blocking pistons 22, 24 occurs only in the base circle region of the cam of the camshaft if a substantial force-free operative connection is present between the cam, the main body 14, the device 18 and the gas exchange valve 12. In the valve stroke region of the cam, the valve spring force presses from below onto the device 18. The blocking pistons 22, 24 are pressed in a direction along the longitudinal axis A against the first circumferential groove 42. The activation fluid pressure is not high enough to overcome the static friction force between the blocking pistons 22, 24 and the first circumferential groove 42. In the base circle region of the cam, no substantial valve force presses from below onto the device 18. The blocking pistons 22, 24 can overcome the static friction and be pressed inwards by the activation fluid pressure. Since the device 18 can switch only force-free, no targeted switching at a certain time point is necessary. In particular, no complicated crank angle-dependent switching of individual cylinders is necessary. The activation fluid pressure can also be applied in the valve stroke region, in which case a switchover takes place only later in the base circle region when the device 18 is most substantially force-free (force-free switchover). Consequently, a cylinder-selective switching is not necessary, which considerably reduces the complexity.

Specifically, the first blocking piston 22 moves from the third position (FIG. 1) into a fourth position (FIG. 7). The second blocking piston 24 moves from the fifth position (FIG. 1) into a sixth position (FIG. 7). If the first blocking piston 22 is in the fourth position and the second blocking piston 24 is in the sixth position, the blocking pistons 22, 24 are no longer mounted in the first circumferential groove 42. In this state, a movement of the actuating piston 20 between the first position and the second position is released (no longer blocked).

While the blocking pistons 22, 24 are pressed inwards, control fluid flows from the control fluid space 38 and the control fluid supply through the ducts 36 into the damping chamber 35. The region around the anti-rotation safeguard 46 is not fluid-tight, with the result that control fluid from the control fluid supply is supplied past the blocking pistons 22, 24 to the ducts 36.

The hydraulic valve play compensation device 26 again compensates for a valve play in the contact body 28. It should also be mentioned at this point that, for a correct mode of operation of the hydraulic valve play compensation device 26, the restoring forces of the elastic elements of the hydraulic valve play compensation device 26 and of the pistons 20, 22, 24 have to be tailored to one another.

Alternatively, an additional axial stop for axially limiting a travel of the actuating piston 20 can also be used. The axial stop can have for example an annular body, as is indicated in FIG. 1 by the reference designation 47.

Figure 8:
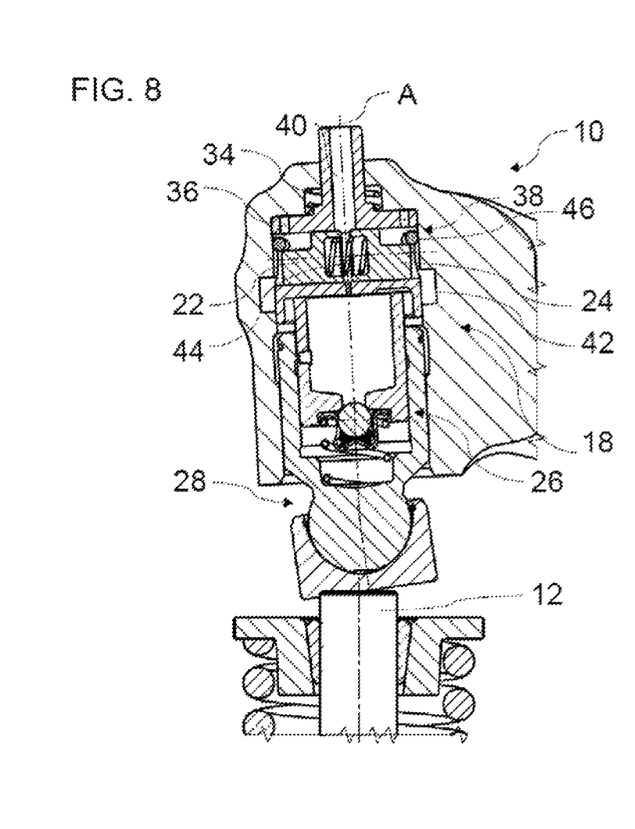
FIG. 8 shows a sectional view through the force transmission means with the activated and actuated device for adapting a valve stroke at a later time point compared with FIG. 7 during the valve opening operation.

In FIG. 8, the device 18 is shown in a state which is assumed after the transition state of FIG. 7 if control fluid continues to be supplied and the cam of the camshaft is in the valve stroke region. The control fluid supply (the solenoid valve in the control fluid supply) continues to be activated.

If the force transmission means pivots about the pivot axis, the spring force of the gas exchange valve 12 has the effect that the released actuating piston 20 moves from the first position (FIGS. 1 and 7) into the second position (FIG. 8). Here, the actuating piston 20 executes a lost motion (lost motion function) by which the valve stroke of the gas exchange valve 12 is reduced. With the movement of the actuating piston 20 between the first position and the second position, the blocking pistons 22 and 24, the hydraulic valve play compensation device 26 and the contact body 28 move along the longitudinal axis A. The form-fitting engagement in the force transmission means 18 now occurs between the bottom region 30 and the actuating piston 20.

During the movement of the actuating piston 20 from the first position to the second position, control fluid is pressed back out of the damping chamber 35 through the ducts 36 into the control fluid space 38. The ducts 36 are configured in such a way that a turbulent flow is hereby generated. For example, the ducts 36 use the principle of a sharp-edged aperture. The throughflow and hence the damping property of the control fluid is thus viscosity-independent. The outflow from the damping chamber 35 and the throughflow through the ducts 36 produce a damping effect in the region of the run-in of the valve stroke, whereby wear and poor acoustics due to rattling noises are prevented.

Some of the control fluid is discharged via the venting duct 40. It should be noted that the blocking pistons 22, 24 and/or the elastic element 44 must be configured in such a way that fluid transport is made possible from the region of the control fluid space 38 between the blocking pistons 22, 24 to the venting duct 40. For example, the elastic element 44 can prevent full areal contact between the blocking pistons 22 and 24. It is also possible for the blocking pistons 22, 24 to have crown-like end regions which can contact one another in a non-sealing manner.

The hydraulic valve play compensation device 26 furthermore compensates for a valve play in the contact body 28.

In the base circle region, the actuating piston 20 moves from the second position back into the first position. With the valve stroke region being reached again, the actuating piston 20 moves again from the first position into the second position. The cycle is repeated for each camshaft revolution of the camshaft as long as the control fluid supply is activated. In the activated state of the device 18, a valve stroke as per the valve stroke curve C in FIG. 9 can be achieved.

The lost motion of the actuating piston 20 with the device 18 activated corresponds to a distance A1 in FIG. 1. This lost motion corresponds to a dead travel A2 (see FIG. 9) by which the valve stroke between the curve B and the curve C (and curve D) is reduced.

Figure 9:
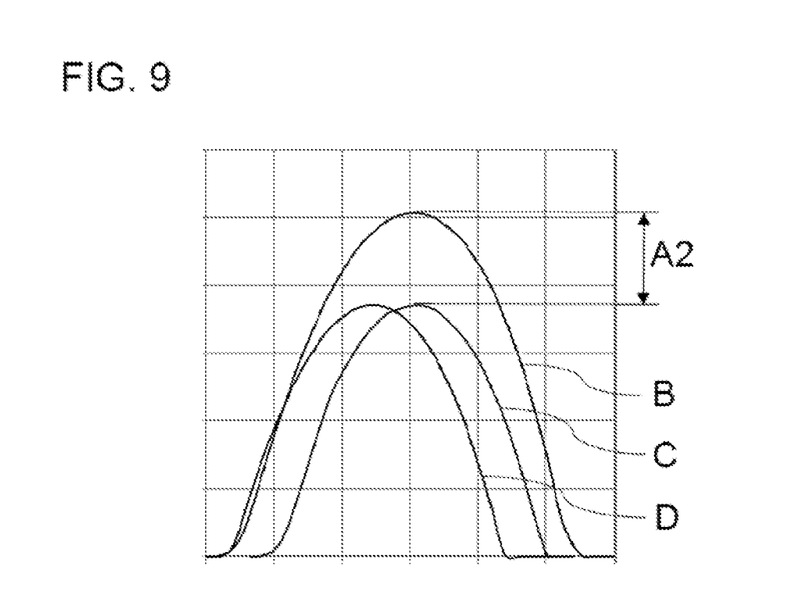
FIG. 9 shows exemplary valve stroke curves which can be achieved with the device for adapting a valve stroke.

If the force transmission device 10 is additionally combined with a camshaft phase adjuster for adjusting the phase of the camshaft, this curve C can be displaced. Thus, for example, the force transmission means 10 in combination with a camshaft phase adjuster can produce a valve stroke profile as per the curve D. Consequently, it is possible, for example, to switch over between a normal operation for one or more inlet valves and a Miller operation with advanced closing time point of the one or more inlet valves by activating and deactivating the device 18.

Figure 10:
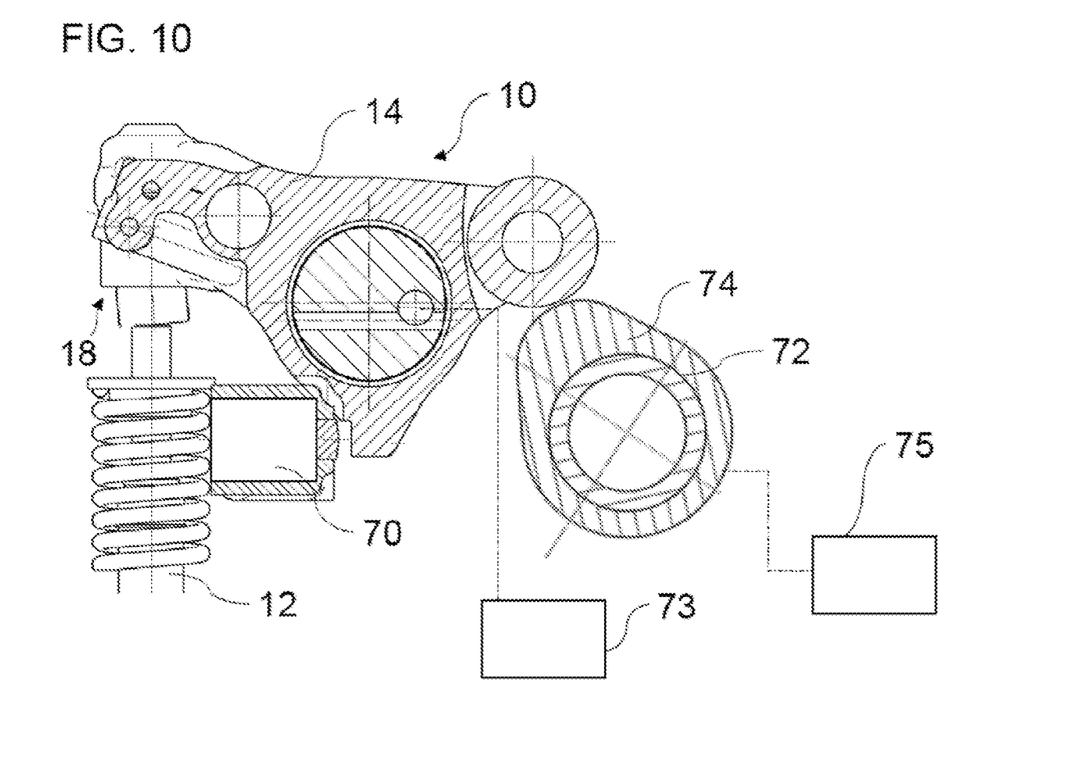
FIG. 10 shows a sectional view through the force transmission means having a damping means for gentle valve strike, a camshaft phase adjuster and a solenoid valve.

FIG. 10 shows an additional optional damping component 70 which makes possible a gentle valve strike with the device 18 activated. The damping component 70 can come selectively into engagement with, for example, the main body 14 of the force transmission device 10 to allow a gentle run-out of the valve stroke curve. The damping component 70 can use, for example, a hydraulic piston having a damping fluid space, in a similar manner to a normal passenger car bumper.

FIG. 10 additionally shows the camshaft 72 with the cam 74. In addition, there is shown purely schematically a camshaft phase adjuster 75 for adjusting a phase of the camshaft 72. Additionally shown in schematic form is a solenoid valve 73 by means of which a supply of control fluid to the device 18 can be controlled. The solenoid valve 73 is fluidically connected to the control fluid supply of the force transmission device 10, in particular via a lubricating fluid duct in a lever axle of the force transmission device 10.

FIG. 11 shows a modified embodiment of the device 18 for changing a valve stroke of a gas exchange valve in a two-stage manner. The device 18 in FIG. 11 does not have a hydraulic valve play compensation device. Instead, the device 18 has a hollow body 76. The hollow body 76 is secured (screwed in) to the main body 14, for example by a thread. A valve play on the contact body 28 can be manually set via the hollow body 76. The hollow body 76 thus acts as a mechanical (manual) valve play compensation device. The locknut 78 serves only for screw securement to ensure that the hollow body 76 cannot rotate. Otherwise, the device 18 of FIG. 11 has a similar mode of construction and operation as the device 18 of FIGS. 1 to 9. In particular, the hollow body 76 has provided therein the actuating piston 20, the blocking pistons 22 and 24, the elastic elements 34 and 44, the damping chamber 35, the anti-rotation safeguard 46, etc., in a similar manner to the embodiments of FIGS. 1 to 9, and therefore there is no need here to repeat the mode of operation thereof. In addition, the embodiment according to FIG. 11 can also have, for example, an axial stop (not illustrated separately in FIG. 11) for limiting an axial displacement of the actuating piston 20, in a similar manner to the axial stop 47 which is shown in FIG. 1.

The present disclosure is not restricted to the exemplary embodiments described above. Rather, numerous variants and modifications are possible which likewise make use of the concept of the present disclosure and thus fall within the scope of protection.

LIST OF REFERENCE DESIGNATIONS 10 force transmission device
12 gas exchange valve
14 main body
16 receptacle
16A first receiving region
16B second receiving region
18 device for adapting a valve stroke in a two-stage manner
20 actuating piston
22 first blocking piston
24 second blocking piston
26 valve play compensation device (HVC element)
28 contact body
28A ball foot
28B ball receptacle
30 bottom region
32 circumferential wall surface
34 first elastic element
35 damping chamber
36 duct
38 control fluid space
40 venting duct
42 first circumferential groove
44 second elastic element
46 anti-rotation safeguard
47 axial stop
48 lubricating fluid space
50 check ball
52 restoring spring
54 high-pressure space
56 duct
58 receptacle
60 cam follower
62 control fluid duct
64 lubricating fluid duct
66 second circumferential groove
68 control valve
70 damping component
72 camshaft
73 solenoid valve
74 cam
75 camshaft phase adjuster
76 hollow body
78 locknut
A longitudinal axis
A1 lost motion
A2 dead travel
B valve stroke curve
C valve stroke curve
D valve stroke curve

I claim:

1. A force transmission device for producing an operative connection between a camshaft and a gas exchange valve of an internal combustion engine, the force transmission device comprising:
a main body with a receptacle which extends along a longitudinal axis (A);
an actuating piston provided in the receptacle such that the actuating piston is configured to move back and forth between a first position and a second position along the longitudinal axis (A);
a contact body configured to actuate the gas exchange valve and is in operative connection with the actuating piston such that a movement of the actuating piston along the longitudinal axis (A) leads to a movement of the contact body along the longitudinal axis (A) so as to change a valve stroke of the gas exchange valve;
a first blocking piston provided in a control fluid space of the actuating piston and in the receptacle such that the first blocking piston is configured to move back and forth in a radial direction with respect to the longitudinal axis (A) between a third position, in which the first blocking piston blocks the actuating piston in the first position, and a fourth position, in which the first blocking piston releases a movement of the actuating piston between the first position and the second position; and
a damping chamber which is configured to be filled with a control fluid and which is emptied during movement of the actuating piston from the first position to the second position so as to damp the movement of the actuating piston, wherein the damping chamber is fluidically connected to the control fluid space of the actuating piston via at least one duct.

2. The force transmission device according to claim 1, wherein the force transmission device is a rocker lever or finger-type rocker.

3. The force transmission device according to claim 1, wherein the gas exchange valve is an inlet valve.

4. The force transmission device according to claim 1, wherein the receptacle in the main body is cylindrical.

5. The force transmission device according to claim 1, further comprising:
a second blocking piston situated opposite the first blocking piston, is provided in the receptacle such that the second blocking piston is configured to move back and forth in a radial direction with respect to the longitudinal axis between a fifth position, in which the second blocking piston blocks the actuating piston in the first position, and a sixth position, in which the second blocking piston releases a movement of the actuating piston between the first position and the second position.

6. The force transmission device according to claim 5, wherein:
the actuating piston is elastically prestressed in a direction towards the first position; or the first blocking piston is elastically prestressed in a direction towards the third position; or
the second blocking piston is elastically prestressed in a direction to the fifth position; or
the first blocking piston and the second blocking piston are elastically supported with respect to one another.

7. The force transmission device according to claim 1, wherein the blocking of the actuating piston in the first position, and the release of the movement of the actuating piston between the first position and the second position, allows a two-stage valve stroke variability for producing two different valve stroke profiles of the gas exchange valve.

8. The force transmission device according to claim 1, wherein the receptacle has a groove, wherein:
the first blocking piston is engaged in the groove in the third position, blocking movement of the first blocking piston along the longitudinal axis (A), and the first blocking piston is disengaged from the groove in the fourth position, releasing the movement of the first blocking piston along the longitudinal axis (A); or
a second blocking piston engaged in the groove in a fifth position, blocking movement of the second blocking piston along the longitudinal axis (A), and the second blocking piston is disengaged from the groove in a sixth position, releasing the movement of the second blocking piston along the longitudinal axis (A).

9. The force transmission device according to claim 8, wherein the groove is a cylindrical circumferential groove around the longitudinal axis (A).

10. The force transmission device according to the claim 1, wherein, when the actuating piston is acted upon via the contact body in a direction along the longitudinal axis (A) to the second position, the actuating piston executes a lost motion from the first position to the second position by which the valve stroke of the gas exchange valve is reduced when the first blocking piston or a second blocking piston releases the movement of the actuating piston between the first position and the second position.

11. The force transmission device according to claim 1, wherein:
the first blocking piston is acted upon hydraulically by supplying the control fluid, so as to move from the third position to the fourth position; or
a second blocking piston is acted upon hydraulically by supplying the control fluid, so as to move from a fifth position to a sixth position.

12. The force transmission device according to claim 1, wherein the first blocking piston or a second blocking piston is guided in or on the actuating piston in the radial direction with respect to the longitudinal axis (A).

13. The force transmission device according to claim 1, wherein,
only when there is a substantially force-free operative connection between the camshaft and the gas exchange valve via the force transmission device, a movement of the first blocking piston or of a second blocking piston is released in the radial direction with respect to the longitudinal axis (A); or,
when the first blocking piston or second blocking piston is acted upon via the contact body in a direction along the longitudinal axis (A) to the second position, a movement of the first blocking piston from the third position into the fourth position or of the second blocking piston from a fifth position into a sixth position is blocked by a static friction on account of a valve opening force between the first blocking piston or the second blocking piston and a groove.

14. The force transmission device according to claim 1, further comprising a control fluid supply and a separately provided lubricating fluid supply.

15. The force transmission device according to claim 1, wherein:
the damping chamber is emptied during movement of the actuating piston from the first position to the second position while generating a turbulent flow, wherein the damping chamber is delimited by the actuating piston and the receptacle.

16. The force transmission device according to claim 1, further comprising:
an anti-rotation safeguard which blocks a rotation of the first blocking piston or a second blocking piston.

17. The force transmission device according claim 1, further comprising:
a valve play compensation device arranged on the contact body in operative connection with the actuating piston and the contact body so as to compensate for a valve play.

18. The force transmission device according to claim 17, wherein one or more of the actuating piston, the first blocking piston, and a second blocking piston is hydraulic, or the valve play compensation device is hydraulic or mechanical.

19. The force transmission device according to claim 1, further comprising a camshaft phase adjuster for the camshaft, the camshaft phase adjuster configured to produce a Miller control time for the gas exchange valve, and further producing a reduced valve stroke for the gas exchange valve.

20. A motor vehicle, in particular a commercial motor vehicle, comprising:
an internal combustion engine including a camshaft and a gas exchange valve; and
a force transmission device for producing an operative connection between the camshaft and the gas exchange valve, the force transmission device including,
a main body with a receptacle which extends along a longitudinal axis (A);

an actuating piston provided in the receptacle such that the actuating piston is configured to move back and forth between a first position and a second position along the longitudinal axis (A);

a contact body configured to actuate the gas exchange valve and is in operative connection with the actuating piston such that a movement of the actuating piston along the longitudinal axis (A) leads to a movement of the contact body along the longitudinal axis (A) so as to change a valve stroke of the gas exchange valve;

a first blocking piston provided in a control fluid space of the actuating piston and in the receptacle such that the first blocking piston is configured to move back and forth in a radial direction with respect to the longitudinal axis (A) between a third position, in which the first blocking piston blocks the actuating piston in the first position, and a fourth position, in which the first blocking piston releases a movement of the actuating piston between the first position and the second position; and a damping chamber which is configured to be filled with a control fluid and which is emptied during movement of the actuating piston from the first position to the second position so as to damp the movement of the actuating piston, wherein the damping chamber is fluidically connected to the control fluid space of the actuating piston via at least one duct.

* * * * *